Jan. 16, 1940.  H. A. KNOX  2,186,978
VEHICLE TRACK CHAIN
Filed Sept. 20, 1937
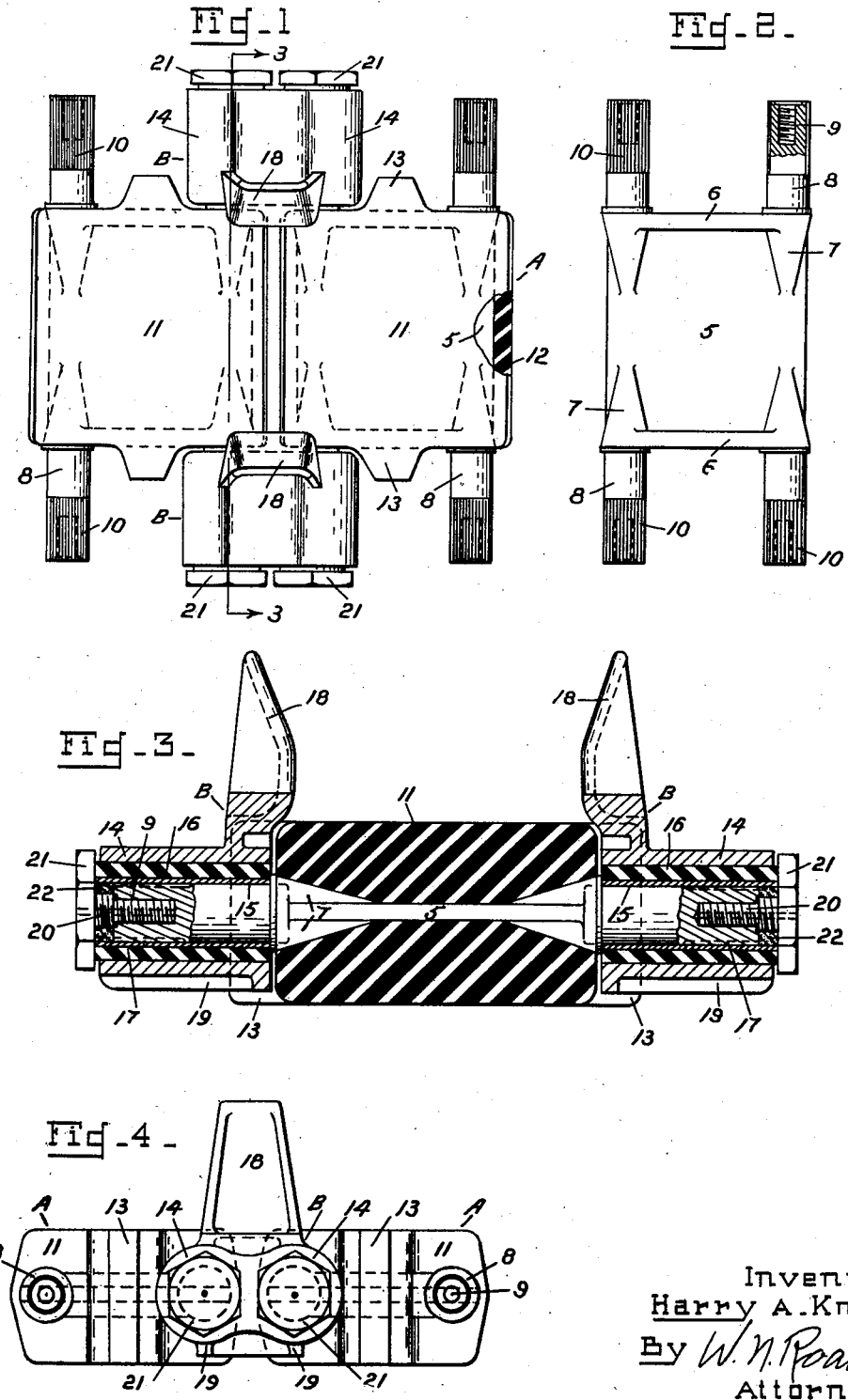
Inventor
Harry A. Knox
By W. N. Roach
Attorney Patented Jan. 16, 1940

2,186,978

UNITED STATES PATENT OFFICE 2,186,978

VEHICLE TRACK CHAIN

Harry A. Knox, Washington, D. C.

Application September 20, 1937, Serial No. 164,744

9 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a vehicle track chain.

The purpose of the invention is to provide a track in which a shoe may include thick rubber blocks while maintaining the height of the shoe at a minimum.

This is accomplished by including in the shoe a metal plate having integral laterally projecting link pins for mounting resilient bushings and rigid links.

A further object of the invention is to provide a simple and efficient arrangement for holding the links and bushings in place.

To these and other ends the invention consists in the construction, arrangement and combination of elements described hereinafter and pointed out in the claims forming a part of this specification.

A practical embodiment of the invention is illustrated in the accompanying drawing wherein:

Fig. 1 is a plan view of a portion of the lower flight of a track constructed in accordance with the invention.

Fig. 2 is a plan view of the metal plate.

Fig. 3 is an enlarged sectional view on the line 3—3 of Fig. 1.

Fig. 4 is a view in side elevation of Fig. 1.

The track comprises a row of shoes A connected in spaced relation by links B.

The shoes are all identical and each consists of a metal plate 5 which may be of the open type shown in U. S. Patent 2,129,696 and having on its two sides flanges 6 which merge at the four corners with inwardly extending reinforced portions 7. A laterally projecting link pin 8 is formed integrally with the plate at each reinforced corner and its outer portion is provided with an axial threaded recess 9 and with longitudinally extending serrations 10 on its periphery.

Blocks 11—11 of rubber or rubber-like material vulcanized to opposite faces of the plate 5 are connected by end portions 12 and by side portions 13 so that the rubber encloses all of the plate except the sides in the vicinity of the link pins.

The links B are all identical and each one is mounted on adjacent link pins of adjacent shoes. Each link includes two bearings 14—14 and in each bearing is a bushing consisting of an inner metal sleeve 15 and an outer sleeve 16 of resilient rubber-like material fixed to the sleeve 15 as by vulcanization. The bushing is inserted in the bearing and it is firmly held in place by compression of the rubber sleeve, by vulcanization, or in any other appropriate manner. The sleeve 15 is provided internally with serrations 17 which interengage the complementary serrations on the link pin. Each link constitutes a driving lug and includes an upstanding guide lug 18 on the portion adjacent the shoe and a pair of cleats 19—19 on the ground-engaging side.

A screw 20 threaded in the recess 9 of each link pin 8 has a large head 21 which serves to confine the bushing, the link, and a fiber washer 22 which is engaged by the threads of the screw.

As seen in Fig. 3 the links and bushings, being positioned laterally of the shoes, in no way interfere with or limit the thickness of the rubber blocks 11—11. It will be readily apparent from an inspection of the drawings that if the bearings 14 were extended through the shoe the thickness of rubber would be considerably reduced. The height of the shoe of this application is two and one-half inches while the height of a shoe containing the bushing would have to be over three inches to provide the same thickness of rubber. Such a thick shoe is not only of increased weight but is subject to greater wear and scuffing as the shoe leaves or engages the ground in moving about the track wheels.

The links B may be easily and quickly removed when it is desired to invert or replace a shoe. As is well understood in the art the relative angular movement of the shoes is permitted by distortion of the rubber sleeve 16.

I claim:

1. A vehicle track chain comprising a series of spaced shoes, each shoe consisting of a metallic plate having a laterally projecting link pin at each of the four corners and integral therewith, said pins formed with serrations, a block of rubber-like material on each face of the plate, end and side pieces of rubberlike material connecting the blocks, a link having a pair of bearings for connecting adjacent pins of adjacent shoes, a bushing in each bearing consisting of an inner metallic sleeve having serrations interengaging the serrations of a link pin and an outer sleeve of resilient rubber-like material fixed to the inner sleeve and to the bearing and a screw threaded in each link pin and having a head confining the link and bushing.

2. A vehicle track chain comprising a series of spaced shoes, each shoe consisting of a metallic plate having a laterally projecting link pin at each of the four corners and integral therewith, said pins formed with serrations, a block of rubber-like material on each face of the plate, a link having a pair of bearings for connecting adjacent pins of adjacent shoes, a bushing in each bearing consisting of an inner metallic sleeve having serrations interengaging the serrations of a link pin and an outer sleeve of resilient rubber-like material fixed to the inner sleeve and to the bearing and a screw threaded in each link pin and having a head confining the link and bushing.

3. A vehicle track chain comprising a series of spaced shoes, each shoe consisting of a metallic plate having a laterally projecting link pin at each of the four corners and integral therewith, a block of rubber-like material on each face of the plate, a link having a pair of bearings for connecting adjacent pins of adjacent shoes, a bushing in each bearing consisting of an inner metallic sleeve and an outer sleeve of resilient rubber-like material fixed to the inner sleeve and to the bearing and a screw threaded in each link pin and having a head confining the link and bushing.

4. A vehicle track chain comprising a series of spaced shoes, each shoe consisting of a metallic plate having a laterally projecting link pin at each of the four corners and integral therewith, a block of rubber-like material on each face of the plate, a link connecting adjacent pins of adjacent shoes, and a bushing of rubber-like material in each bearing.

5. A vehicle track chain comprising a series of spaced shoes, each shoe consisting of a metallic plate having a laterally projecting link pin at each of the four corners and integral therewith, a block of rubber-like material on each face of the plate, and a link connecting adjacent pins of adjacent shoes.

6. A vehicle track chain comprising a series of spaced shoes, each shoe including a plate having a laterally projecting link pin at each of the four corners and integral therewith, a link having a pair of bearings for connecting adjacent pins of adjacent shoes, a bushing in each bearing including an inner metallic sleeve, and an outer sleeve of resilient rubber-like material fixed to the inner sleeve and to the bearing.

7. A vehicle track chain comprising a series of spaced shoes, each shoe including a plate having a laterally projecting link pin at each of the four corners and integral therewith, a link having a pair of bearings for connecting adjacent pins of adjacent shoes, and a screw threaded in each link pin and having a head confining the link and bearing.

8. A vehicle track chain comprising a series of spaced shoes, each shoe including a metallic plate having a laterally projecting link pin at each of the four corners, a block of rubber-like material on each face of the plate, side pieces of rubber-like material connecting the blocks, links connecting adjacent link pins of adjacent shoes, and said links disposed between the side connecting pieces of adjacent shoes.

9. A track shoe comprising a metallic plate having a laterally projecting link pin at each of the four corners, a block of rubber-like material on each face of the plate, and end and side pieces of rubber-like material connecting the blocks.

HARRY A. KNOX.